United States Patent

Gamoso

[11] Patent Number: 5,870,892
[45] Date of Patent: Feb. 16, 1999

[54] ELECTRICAL ENERGY GENERATOR

[76] Inventor: Pedro V. Gamoso, 328 Lafayette Ave., Passaic, N.J. 07055

[21] Appl. No.: 863,144

[22] Filed: May 27, 1997

[51] Int. Cl.$^6$ .................................................. F16D 31/02
[52] U.S. Cl. .............................................. 60/413; 60/407
[58] Field of Search ............................ 60/407, 410, 412, 60/413, 415; 290/43, 54

[56] References Cited

U.S. PATENT DOCUMENTS

| | | | |
|---|---|---|---|
| 2,756,562 | 7/1956 | Deitrickson | 60/415 X |
| 3,321,909 | 5/1967 | Gordon | 60/413 X |
| 3,677,008 | 7/1972 | Koutz | 60/407 X |
| 3,988,897 | 11/1976 | Strub | 60/413 X |
| 3,996,741 | 12/1976 | Herberg | 60/413 X |
| 4,031,702 | 6/1977 | Burnett et al. | 60/413 X |
| 4,110,981 | 9/1978 | Murphy | 60/415 X |
| 4,180,980 | 1/1980 | Marks et al. | 60/407 X |
| 4,208,592 | 6/1980 | Leibow et al. | 290/52 |
| 4,321,475 | 3/1982 | Grub | 60/413 X |
| 5,027,000 | 6/1991 | Chino et al. | 60/413 X |
| 5,050,380 | 9/1991 | Jonsson | 60/413 |

*Primary Examiner*—John E. Ryznic
*Attorney, Agent, or Firm*—Michael I. Kroll

[57] ABSTRACT

An electrical energy generator for converting potential energy into electrical energy. The electrical energy generator includes a water tank filled to a predetermined level with a predetermined amount of water. A circulation tube having a top and bottom end which are both connected to the water tank. A first pump is connected to the circulation tube for drawing water from the water tank for circulating through the circulation tube and back to the water tank and a second pump for delivering air to the circulation tube for mixing with the water and delivery to and compression in the water tank. An air engine is connected to receive the compressed air within the water tank and expand the compressed air to release energy contained therein. An electrical generator is connected to the air engine and receives the energy released from the compressed air for generating electricity by conversion of the energy released from the air.

7 Claims, 5 Drawing Sheets

ELECTRICAL ENERGY GENERATOR

BACKGROUND OF THE INVENTION

1. Field of the Invention

The instant invention relates generally to electrical generators and, more specifically, to an electrical energy generator powered by conversion of potential energy stored in compressed air.

2. Description of the Prior Art

Numerous electrical energy generators have been provided in the prior art and conversion of energy from one form to another has been practiced for centuries. For example, windmills have been used to harness the potential energy of the wind and convert the energy to mechanical energy. Water wheels have also been used for energy conversion purposes to use the power stored within flowing water. Such wheels have been used to harness the potential energy of the flowing water and convert it to a more useful form. Presently, nuclear power plants are used to convert nuclear energy into a more convenient form of electrical energy and solar panels are used to harness the energy of the sun for conversion into electrical energy for lighting and heating houses and buildings. However, present methods and devices used for energy conversion are unable to convert a large amount of the potential energy from its original form to a more suitable form and require a large amount of energy to perform the conversion process. Therefore, these methods are highly inefficient and costly.

While these devices and methods may be suitable for the particular purpose to which they address, they would not be as suitable for the purposes of the present invention as heretofore described.

SUMMARY OF THE PRESENT INVENTION

The present invention relates generally to electrical energy generators and, more specifically, to generators able to convert potential energy stored in compressed air to electrical energy.

A primary object of the present invention is to provide an electrical energy generator that will overcome the shortcomings of prior art devices.

Another object of the present invention is to provide an electrical energy generator which is able to convert potential energy stored in compressed air to electrical energy with minimal loss.

A further object of the present invention is to provide an electrical energy generator which is able to convert potential energy stored in compressed air to electrical energy using water pressure to aid in compressing the air.

A yet further object of the present invention is to provide an electrical energy generator which uses a water pump and tank to circulate the water and mix the water and air.

Another object of the present invention is to provide an electrical energy generator that is simple and easy to use.

A still further object of the present invention is to provide an electrical energy generator that is economical in cost to manufacture.

Additional objects of the present invention will appear as the description proceeds.

An electrical energy generator for converting potential energy into electrical energy is disclosed by the present invention. The electrical energy generator includes a water tank filled to a predetermined level with a predetermined amount of water. A circulation tube having a top and bottom end which are both connected to the water tank below the water level. A first pump is connected to the circulation tube for drawing water from the water tank, circulating the water through the circulation tube and delivering the water back to the water tank and a second pump for delivering air to the circulation tube for mixing with the water for delivery to and compression in the water tank. An air engine is connected to receive the compressed air within the water tank and expand the compressed air to release energy contained therein. An electrical generator is connected to the air engine and receives the energy released from the compressed air for generating electricity by conversion of the energy released from the air.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
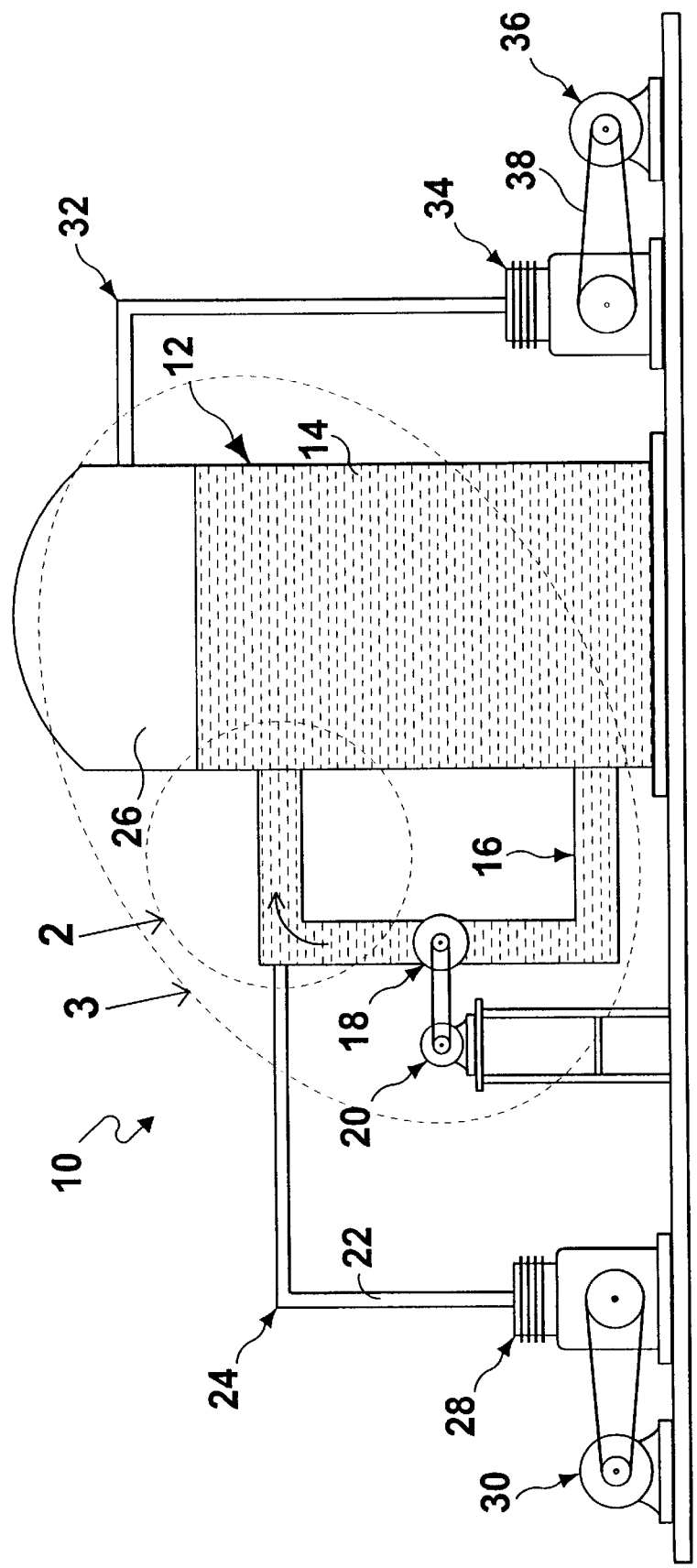
FIG. 1 is a schematic diagram illustrating the electrical energy generator of the present invention.

Turning now descriptively to the drawings, in which similar reference characters denote similar elements throughout the several views, the Figures illustrate an electrical energy generator of the present invention. With regard to the reference numerals used, the following numbering is used throughout the various drawing figures.

10 electrical energy generator of the present invention
12 water tank
14 water contained within the water tank
16 water circulation tube
18 water pump
20 generator for powering water pump
22 low pressure air
24 air tube
26 compressed air in water tank
28 air pump
30 generator for powering air pump
32 compressed air release tube 34 air engine
36 electrical generator powered by air engine
38 electrical power converted by air engine
40 electrical energy generated by electrical generator

DETAILED DESCRIPTION OF THE PREFERRED EMBODIMENT

Turning now descriptively to the drawings, in which similar reference characters denote similar elements throughout the several views, FIGS. 1 through 4 illustrate the electrical energy generator of the present invention indicated generally by the numeral 10.

The electrical energy generator 10 includes a water tank 12 filled to a predetermined level with water 14 and a water pump 18 for circulating the water 14 within the water tank 12 through a circulation tube 16. The water pump 18 is powered by a first generator 20. The first generator 20 is conventional in nature and any known generator able to supply the water pump 18 with enough power to circulate the water 14 through the circulation tube 16 may be used. A compressed air tube 24 is connected to the circulation tube 16 for supplying air 22 to the circulation tube 16 for combining and mixing with the water 14 and eventual deposit within the water tank 12.

An air pump 28 is connected to the air tube 24 at a side opposite the connection with the circulation tube 16 for introducing air 22 into the air tube 24. The air pump 28 is powered by a second generator 30. The second generator 30 is conventional in nature and any known generator able to supply the air pump 28 with enough power to pump air 22 through the air tube 24 and into the circulation tube 16 for mixing with the water 14.

Upon entering the water tank 12, the air 22 rises to the top of the tank 12 above the water 14, the amount of water 14 in the tank 12 remaining constant throughout the operation. As more air 22 is pumped into the air tube 24 and combined with the water 14, the amount of air within the tank 12 increases while the space allotted above the water level for containing the air remains constant Thus, the air pressure within the tank 12 increases due to an increase of the amount of air 26 within the tank 12 which has accumulated above the surface of the water 14.

A compressed air exhaust tube 32 is connected to the tank 12 at a position above the surface level of the water 14. The compressed air 26 accumulated above the surface of the water 14 exits the tank 12 through this tube 32 for delivery to an air engine 34. The air engine 34 receives the compressed air 26 from the compressed air tube 32 and acts to expand this air 26 thereby releasing the potential energy stored therein. The energy released from the compressed air 26 by the air engine 34 is then provided through an appropriate connection 38 to an electrical generator 36 for the production of electrical energy 40 which may be used to run any electrical device. A block diagram illustrating this process and supplementing the schematic diagram of FIG. 1 is provided in FIG. 4.

Figure 2:
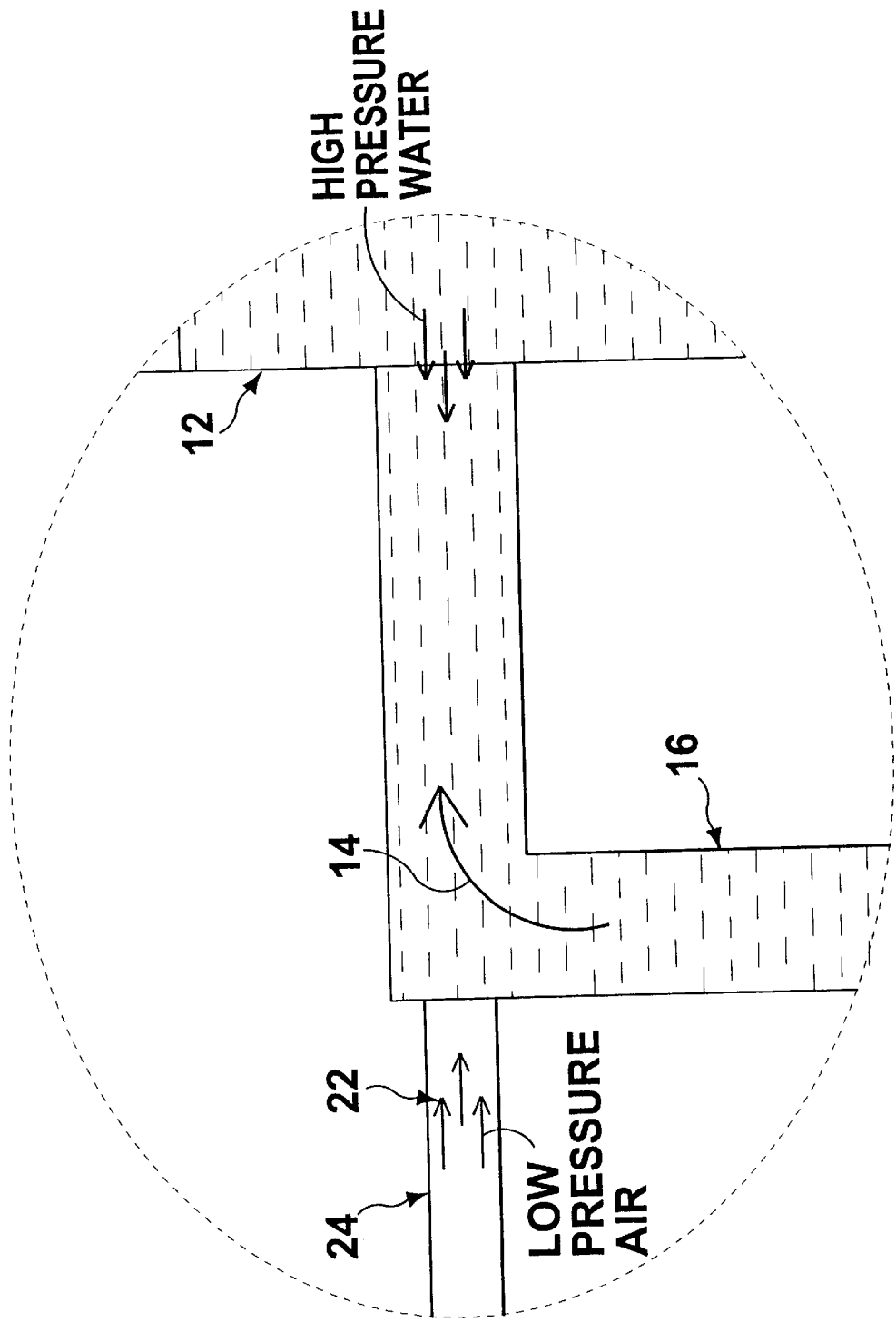
FIG. 2 is a schematic drawing illustrating the combination of circulating water and compressed air in the circulation tube of the electrical energy generator of the present invention.

FIG. 2 illustrates the use of circulating the water 14 in the tank 12 to supply air 22 to the tank 12. As can be seen from this figure, water 14 from the tank 12 applies a pressure toward the circulation tube 16 as the water level in the tank 12 is above the connection of the circulation tube 16 to the tank 12. The pressure applied by the water towards the circulation tube 16 is proportional to the water level in the tank 12. This pressure is opposed by the water 14 circulating in the circulation tube 16. The amount of pressure applied by the circulating water is determined by the water pump 18 and this circulating water 14 acts to push back the high pressure water coming from the tank 12. Positioned behind the circulating water 14 and traveling in the same direction is the low pressure air 22 supplied through the air tube 24 by the air pump 28. The circulating water 14 counteracts the force of the high pressure applied by the water within the water tank 12 and thus provides a clear path for air 22 to enter the tank 12.

Figure 3:
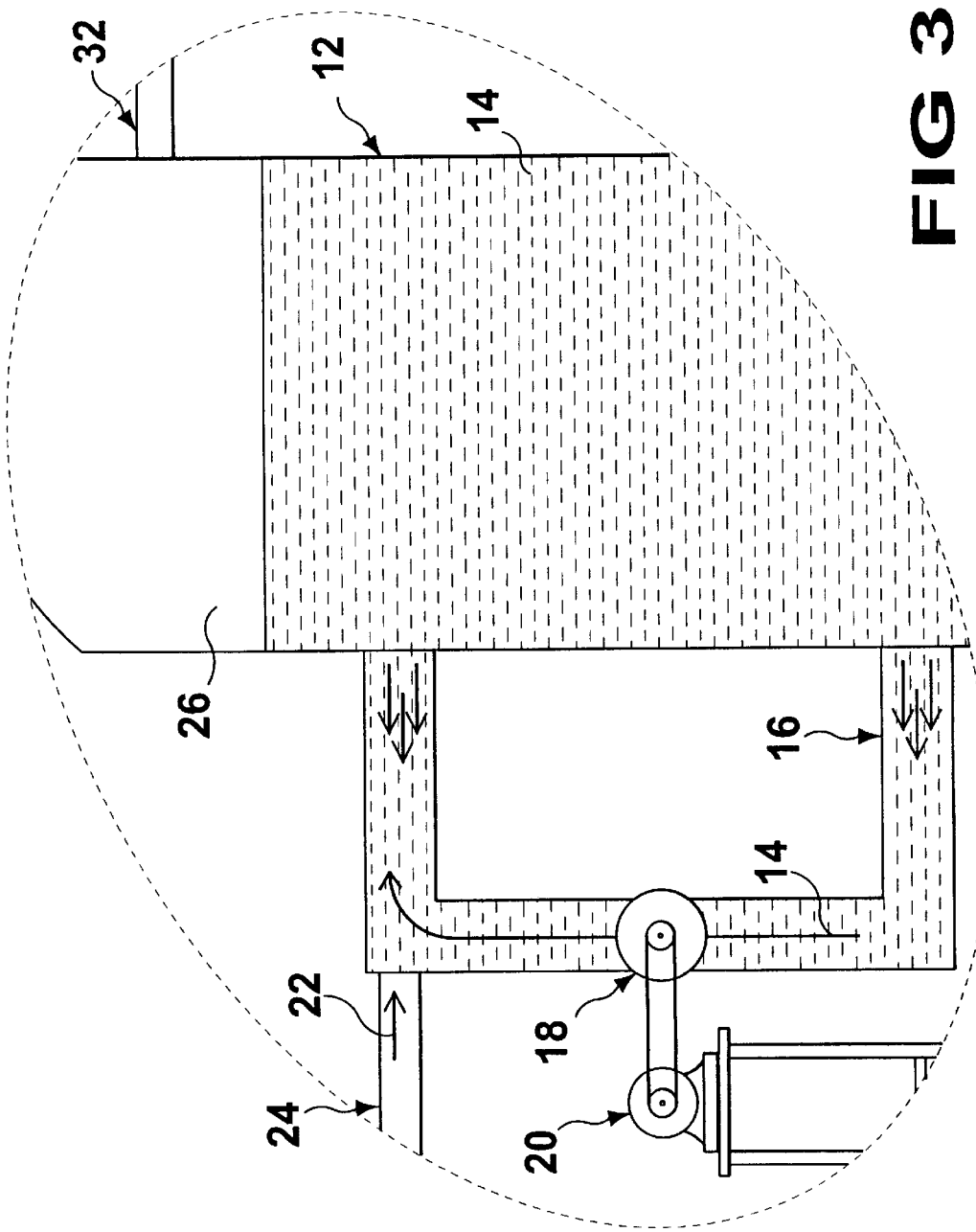
FIG. 3 is a schematic drawing illustrating the forces acting on the circulating water in the electrical energy generator of the present invention.
Figure 4:
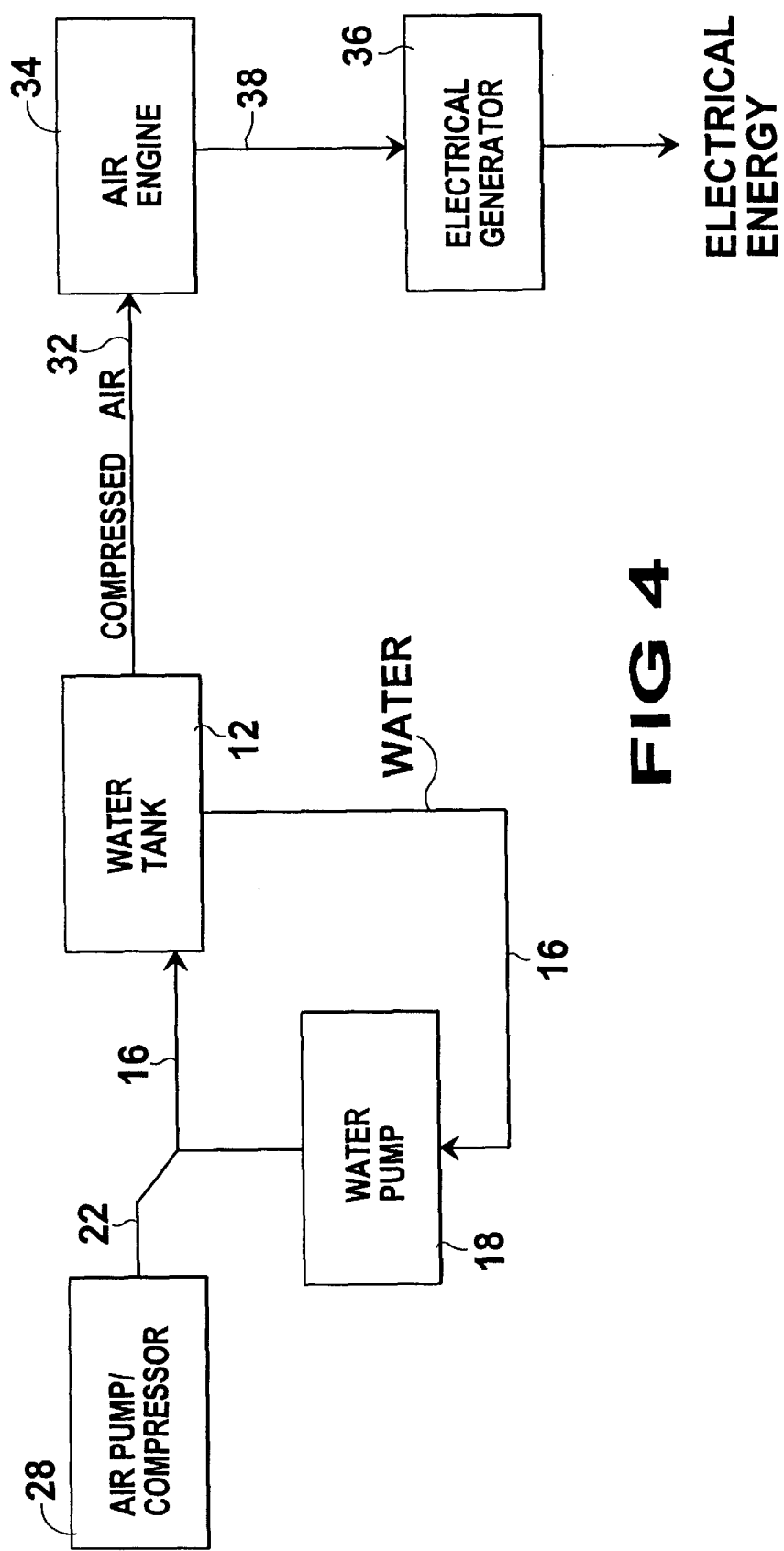
FIG. 4 is a block diagram illustrating the combination of components in the electrical energy generator of the present invention.

FIG. 3 illustrates the use of circulating the water 14 in the tank 12. In order to pump water into the tank 12 an entrance pressure supplied by the water 14 presently in the tank 12 must be overcome. The entrance pressure upstream of the pump is a negative pressure exerted towards the circulating tube 16 which prevents water 14 from entering the tank 12 through the circulation tube 16. At the other side of the circulation tube 16, water 14 from the tank 12 enters with a pressure equal and opposite to the pressure exerted by the water at the opposite end of the circulation tube 16. These two pressures cancel themselves out and thus the water pump 18 will not experience any resistance to circulating the water and thus will use a minimal amount of energy because the pump only needs to overcome flow resistance and not pressure differences.

Figure 5:
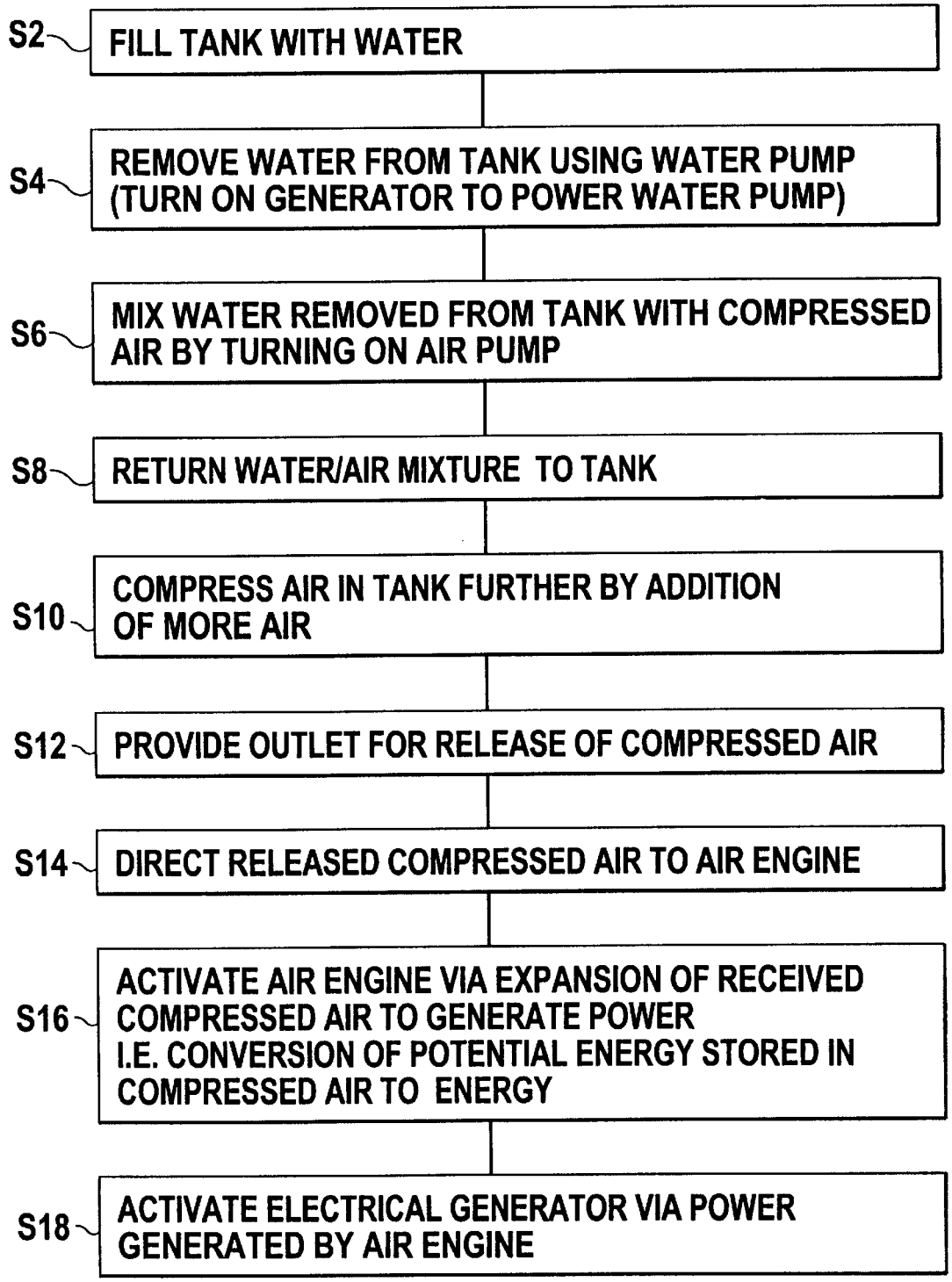
FIG. 5 is a flow chart illustrating the operating process of the electrical energy generator of the present invention.

The operation of the electrical energy generator 10 of the present invention will now be described with specific reference to FIG. 5. In operation, the tank 12 is filled with a predetermined amount of water 14, the predetermined amount of water 14 must fill the water tank 12 to a level above the connection of the circulation tube 16 as stated in step S2. The water 14 is then removed from the tank 12 through the circulation tube 16 using a water pump 18, see step S4. The water 14 in the circulation tube 16 is then mixed with air 22 delivered to the circulation tube 16 by an air pump 28 through an air tube 24 as described in step S6. The water 14 and air 22 mixture is then returned to the tank 12, the air rises to the top of the tank 12 while the water 14 is continually circulated, step S8. The air 22 continues to be added to the tank 12 in its mixture with the water 14 and rises to the top of the tank 12 above the level of the water 14. This causes the further compression of the air 26 presently in the tank 12 as stated in step S10.

The pressurized air 26 is then released from the tank 12 through an air tube 32 and delivered to an air engine 34, steps S12 and S14. The air engine 34 is activated to cause the expansion of the pressurized air 26 and thus release the potential energy contained therein, i.e. conversion of the potential energy in the air under pressure to energy thereby generating power to be supplied to an electrical generator 36 as described in step S16. The air engine 34 is connected via an appropriate supply line 38 to supply the power generated by the conversion of the potential energy contained in the compressed air 22 and thus activate the electrical generator 36, step S18. Upon receipt of the energy used to power the electrical generator 36, the electrical generator acts through conversion of this power to generate electrical energy 40. The electrical generator 36 is thus powered by conversion of potential energy stored in compressed air 26 using a minimal amount of energy to power the electrical energy generator 36 of the present invention.

From the above description it can be seen that the electrical energy generator of the present invention is able to overcome the shortcomings of prior art devices by providing an energy generator which is able to convert potential energy stored in compressed air to electrical energy with minimal energy loss using a water pump and tank to circulate the water and mix the water and air. The electrical energy generator of the present invention is also able to convert potential energy stored in compressed air to electrical energy using water pressure to aid in compressing the air while expending a minimal amount of energy in compressing the air. Furthermore, the electrical energy generator of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An electrical energy generator for converting potential energy into electrical energy, said electrical energy generator comprising:
   a) a water tank including a predetermined amount of water positioned therein;
   b) a circulation tube having a top and bottom end, both said top and bottom ends being connected to said water tank;
   c) first pump means for drawing said water from said water tank and circulating said water through said circulation tube and back to said water tank;
   d) second pump means for delivering air to said circulation tube and mixing with said water, said water and air mixture being delivered to said water tank wherein continual addition of said air acts to compress said air within said tank;
   e) an air engine connected to receive said compressed air within said water tank and expanding said compressed air to release energy contained within said compressed air; and
   f) an electrical generator for receiving said energy released from said compressed air and generating electrical energy via conversion of said released energy.

2. An electrical energy generator as recited in claim 1, wherein said first pump is a water pump.

3. An electrical energy generator as recited in claim 2, wherein said second pump is an air pump.

4. An electrical energy generator as recited in claim 3, further comprising an air tube connected between said second pump and said circulation tube for providing a passageway for delivery of said air from said second pump to said circulation tube.

5. An electrical energy generator as recited in claim 4, further comprising a second electrical generator for providing energy to said first pump.

6. An electrical energy generator as recited in claim 5, further comprising a third electrical generator for providing energy to said second pump.

7. An electrical energy generator as recited in claim 1, wherein said tank is filled with said water to a predetermined level and said circulation tube is connected to said tank at a position below said predetermined water level.

\* \* \* \* \*